United States Patent
Harel et al.

(10) Patent No.: US 10,541,738 B1
(45) Date of Patent: Jan. 21, 2020

(54) METHODS AND SYSTEMS FOR V2X CONGESTION CONTROL USING DIRECTIONAL ANTENNAS, AND DETERMINING OBU TRANSMISSION POWER BASED ON THE WEATHER DATA RECEIVED FROM VEHICLE CAN

(71) Applicants: Jacob Harel, Redwood City, CA (US); Kirubasankar Madhaiyan, Bangalore (IN); Prasanna Kumar Bolisetty Yeswanth Naga, Bangalore (IN)

(72) Inventors: Jacob Harel, Redwood City, CA (US); Kirubasankar Madhaiyan, Bangalore (IN); Prasanna Kumar Bolisetty Yeswanth Naga, Bangalore (IN)

(73) Assignee: Savari, Inc., Santa Clara, CA (US)

( * ) Notice: Subject to any disclaimer, the term of this patent is extended or adjusted under 35 U.S.C. 154(b) by 0 days.

(21) Appl. No.: 16/396,761

(22) Filed: Apr. 28, 2019

(51) Int. Cl.
| | |
|---|---|
| *H04L 5/00* | (2006.01) |
| *H04B 7/06* | (2006.01) |
| *H04B 7/0426* | (2017.01) |
| *H04W 28/02* | (2009.01) |
| *H04W 40/02* | (2009.01) |
| *H04W 40/16* | (2009.01) |

(52) U.S. Cl.
CPC ........... *H04B 7/0639* (2013.01); *H04B 7/043* (2013.01); *H04W 28/0289* (2013.01); *H04W 40/023* (2013.01); *H04W 40/026* (2013.01); *H04W 40/16* (2013.01)

(58) Field of Classification Search
CPC ..... H04B 7/0639; H04B 7/043; H04W 40/16; H04W 40/026; H04W 28/0289; H04W 40/023
USPC .......................................................... 375/262
See application file for complete search history.

(56) References Cited

U.S. PATENT DOCUMENTS

| | | | |
|---|---|---|---|
| 8,412,106 B2* | 4/2013 | da Silva | H04B 7/04 455/63.4 |
| 2015/0030060 A1* | 1/2015 | Kyosti | H04B 17/391 375/224 |
| 2015/0348412 A1* | 12/2015 | Onishi | G08G 1/096791 340/905 |
| 2018/0132340 A1* | 5/2018 | Correa | H05B 37/0281 |
| 2019/0096262 A1* | 3/2019 | Dotzler | G08G 1/205 |

* cited by examiner

*Primary Examiner* — Don N Vo
(74) *Attorney, Agent, or Firm* — MaxValueIP LLC

(57) ABSTRACT

Self-driving and autonomous vehicles are very popular these days for scientific, technological, social, and economical reasons. In one aspect of this technology, one of the main concerns for an implementation of any V2X technology on a large scale is the issue of congestion control. In large cities and crowded highways during rush hours, each host vehicle can get messages from over 200 other vehicles and several road side units, all working on the same channel and trying to send and receive messages at the same time. With respect to the weather effect on signal, the signal path loss occurs whenever there is moderate (or moderate plus) rain, and because of that, the OBU communications packets are prone to get lost, or communication coverage region gets diminished, depending upon the intensity, speed, angle and temperature of the rainfall/snowfall droplets. We have provided the solutions for these 2 problems, with variations.

20 Claims, 10 Drawing Sheets

US 10,541,738 B1

METHODS AND SYSTEMS FOR V2X CONGESTION CONTROL USING DIRECTIONAL ANTENNAS, AND DETERMINING OBU TRANSMISSION POWER BASED ON THE WEATHER DATA RECEIVED FROM VEHICLE CAN

RELATED APPLICATIONS

Savari, Inc., the assignee of the current application, owns other related US IPs/patents/applications, issued or pending, related to self-driving and autonomous vehicles, and corresponding systems and methods, by some other inventors (other than the ones here in this current application), which we incorporate herein by reference, e.g., for their teachings for the complementary parts of their overall system/method or for the other modules, systems, or methods.

BACKGROUND OF THE INVENTION

Self-driving and autonomous vehicles, as well as ADAS, are very popular these days for scientific, technological, social, and economical reasons. V2X is an important aspect of these technologies. In one aspect of this technology, congestion control is very important for optimum utilization of the limited communication RF spectrum environment and efficiency of the system. In another aspect of the technology, depending on the weather, we would like to adjust the transmission power to have enough power to support the required SNR (signal to noise ratio) and PER (packet error rate) required, but at the same time, not to exceed the power level needed, for optimum/minimum performance requirement.

Both aspects of the invention, the weather data usage invention and the directional antenna usage invention, go under one umbrella called "V2X propagation optimizations". The core debate of C-V2X vs DSRC centers around receiving antenna diversity.

In our other related/prior applications and patents, we have addressed/discussed V2X and C-V2X as emerging technologies for safety applications. One of the main concerns for an implementation of any V2X technology on a large scale is the issue of congestion control. In large cities and crowded highways during rush hours, each host vehicle can get messages from over 200 other vehicles and several road side units, all working on a small number of channels and a relatively small spectrum band, trying to send and receive messages at the same time. Given the limited bandwidth and data rate for DSRC and even PC5-based CV2X, the system needs to take some steps to limit the traffic over the communication link to enable the network to continue functioning without effecting transportation safety.

Until now the approach to resolve the issue of congestion on the communication link has been to first limit the volume of traffic by limiting the number of messages sent by each device on the link. The second step has then been to reduce the power output, i.e., reducing the range of each vehicle communication, and as such, enable more cars to send message within a geographic region, without interfering with each other. The problem with reducing power output in a typical V2X system (that is using omni direction) is that it will affect the range in the driving direction, and thus, jeopardizing the performance of some of the safety applications.

With respect to the weather effect on signal, here are some of the prior work/references/data:

http://www.unn.edu.ng/publications/files/images/UMEH, %20CHIBUIKE %20DOMINIC.pdf
http://irep.iium.edu.my/47933/1/WIECONECE2015.pdf
https://www.hindawi.com/journals/ijap/2017/8694748/
https://nmi.org.uk/wp-content/uploads/2014/12/AESIN-V2X-Visteon-reserach_MG.pdf
http://scholar.uwindsor.ca/cgi/viewcontent.cgi?article=6481&context=etd
https://arxiv.org/pdf/1604.08734.pdf
https://www.degruyter.com/downloadpdf/j/jee.2012.63.issue-1/v10187-012-0005-y/v10187-012-0005-y.xml
https://www.degruyter.com/view/j/jee.2012.63.issue-1/v10187-012-0005-y/v10187-012-0005-y.xml
http://www.jpier.org/PIERM/pierm16/17.10100303.pdf
http://festag-net.de/doc/ITST-2008_congcontrol.pdf
https://ece.uwaterloo.ca/~n71u/jrnl_14_IoTJ_LCZSM.pdf
https://www.hindawi.com/journals/ijap/2013/981281/
http://www.ieee802.org/16/tg2orig/contrib/80216cc-99_24.pdf
https://en.wikipedia.org/wiki/Rain # Intensity
https://www.ncbi.nlm.nih.gov/pmc/articles/PMC3081171/
http://www.rand.org/content/dam/rand/pubs/reports/2006/R1694.pdf
http://www.philsrockets.org.uk/Rain %20Fades.pdf
http://patentimages.storage.googleapis.com/pages/U.S. Pat. No. 4,705,998-1.png
http://ecjones.org/propag.html We will provide the solutions for these 2 problems below. Please note that there is no prior art or product in the industry that teaches the following features in our disclosure here (with respect to the 2 issues that are mentioned above).

SUMMARY OF THE INVENTION

This disclosure, e.g., adds the following improvements on our platform technologies, as some of the embodiments:

With respect to the congestion control, we can show this concept with our system by just using the 2 outputs we have for diversity from each of the DSRC devices. We use a semi-directional antenna with forward and backward main lobs. We can control if the system is using diversity or not, and by setting the 2 antennas orthogonally, we can get a simple implementation of this concept. (See, e.g., Appendix 3, FIGS. 1-4, with different variations of the concept.)

In one embodiment, as for the complexity of this system, part of the system could be done by using an RF amplifier with individual antenna switching. This can limit the complexity to the system and have only a control interface for the antennas switching and a single RF connection.

With respect to the weather effect on signal, the signal path loss occurs whenever there is moderate (or moderate plus) rain, and because of that, the OBU communications packets are prone to get lost, or communication coverage range gets diminished, depending upon the intensity, speed, angle and temperature of the rainfall/snowfall droplets.

To compensate for this rainfall/snowfall specific path loss, or the loss in coverage range, OBU receives the sensor data input from the CAN bus (including the Wiper Motor setting) and increment the transmitting power (Say, by 0.x %), in accordance with the wiper motor speed. Once the wiper motor ceases to operate (i.e., rain/snow stops), the OBU transmitting power shall come back to the initial preconfigured TxPwr value.

DETAILED DESCRIPTION OF THE PREFERRED EMBODIMENTS

Based on the discussions above, to solve the 2 problems mentioned above, we have the following embodiments of this invention, starting with the communication congestion issue:

Congestion Problem:

One aspect of the present invention provides a method to control the communication congestion on the data link by selectively changing the radiated transmission and reception pattern, and/or adjusting power on deferent sectors around the car. In a typical CV2X implementation, the system is using a standard omni directional antenna. In this case, reducing the output power will affect the signal radiation in all directions. But when we are looking in a transportation safety system, the transmission and reception range in the direction of movement could be more critical for the safety applications, especially when moving at high speed, like in the case of multi-lane highway.

Figure 1:
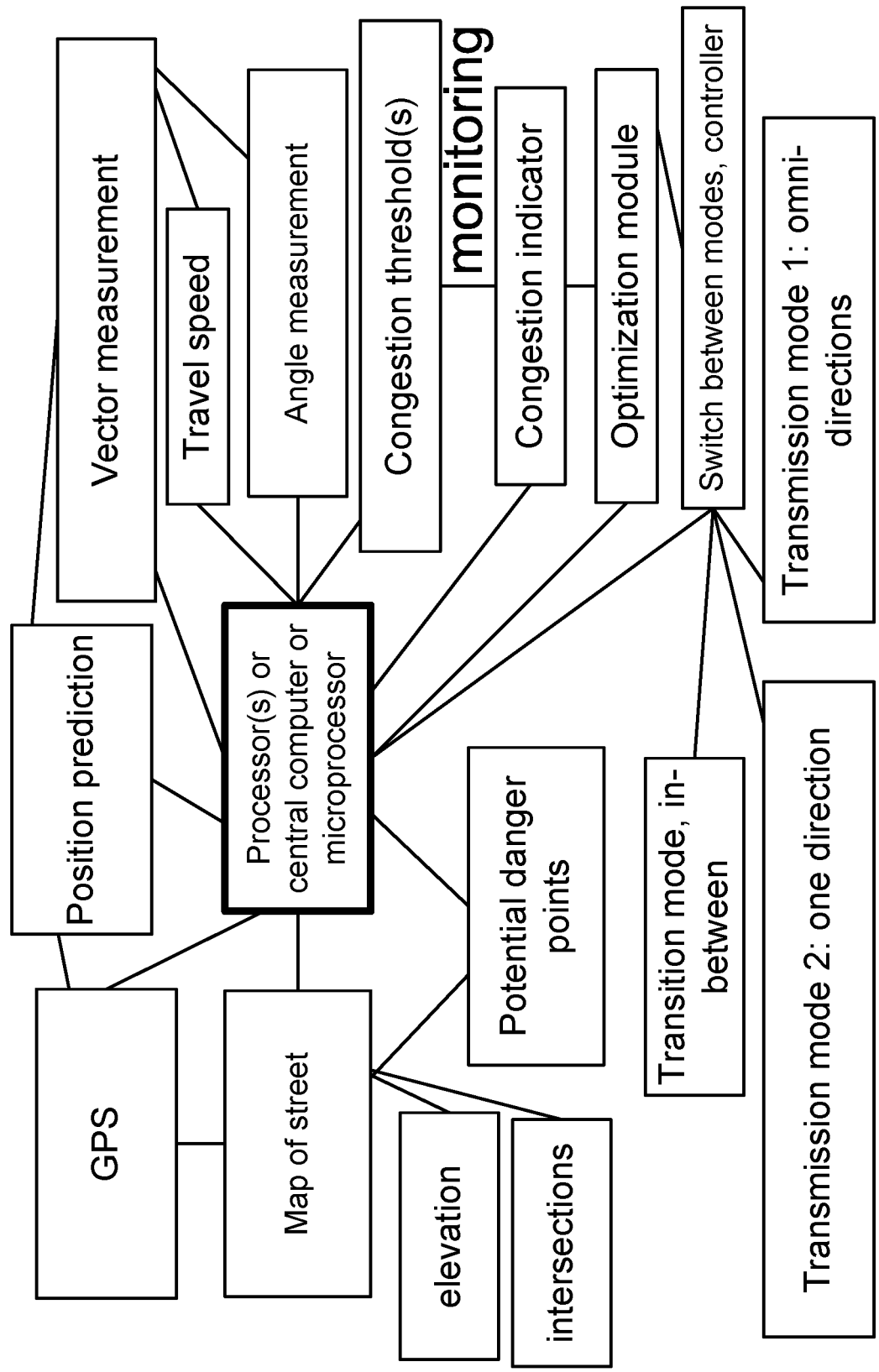
FIG. 1 is for one embodiment, as an example, for a system with monitoring congestion with multiple modes of transmission, including transition mode.

In the basic embodiment of this method, we will use 2 or more antennas with specific radiation patterns (Appendix 3 FIG. 1). In the case of 2 antennas, one will be a directional antenna with a transition beacon pointed forward and backward (Appendix 3 FIGS. 2-3). The other antenna with that same radiation pattern will be mounted orthogonally, to cover the left and right sides of the car. The V2X system will be able to transmit and receive independently on the 2 antennas. In other embodiments, an omnidirectional antenna can be used as the second antenna to cover the case of omni directional transmission, while the first antenna will be used for directional transmission. In all cases, we will also be able to vary the power output on the antennas independently. This can be generalized, with more antennas added to cover more directions, e.g., 6 directions, as shown in Appendix 3 FIG. 4. So, the number can be adjusted, as well as using a combination of regular and directional antenna or antennas, together. The system can also take advantage of an antenna array as a part of the antenna system. An antenna array can dynamically change the antenna beam to match the needed coverage, in the same way as we are doing with switching between directional antennas.

In the basic algorithm for congestion control, once a congestion is detected on the communication channel, the system will switch from transmitting in an omni directional radiation pattern to more directional pattern, with the emphasis on the front and the back of the car. The reception of messages from the system will continue in an omnidirectional method, since threats in an automotive environment can come from all direction, like in an intersection. By limiting the transmission to a specific relevant sector, the cars that are out of this region will get less messages. If all the targets in the system behave the same, the overall number of messages each target gets will be reduced and the channel congestion will be avoided.

Since in this method we are continuing to transmit the longer range in the relevant sectors, and since we are avoiding the channel congestion, the safety application can continue working and providing the correct information to the drivers in other cars. The target cars will continue getting messages in an omnidirectional pattern, or any other pattern and from different sectors than the one we are transmitting to. And since the channel is not congested, it will be able to get all the relevant messages to analyze potential threats and send appropriate warnings to the driver. The transmission radiation pattern and the radiation receiving pattern are completely independent.

In another embodiment, the system uses multiple antennas that can be arraying in a pattern that will enable it to work as an antenna array and target sectors that are on the specific radiation pattern on any individual antenna. The antenna array can include multiple elements and be in any shape, e.g., Cassegrain antenna or parabolic antenna.

In another embodiment, the selection of sectors is based on a map of the roads. The sectors for transmission and reception will be independently selected. The sector selection is based on road direction and intersection topology. We can also get the Yaw from the car sensors and adjust the beam to the driving direction.

In another embodiment, the transmission sectors will also be selected based on the received messages from other targets. If the algorithm determines that the target can be a potential threat to us or to itself, it will include the relevant sector to ensure that the target is within the reception range to get the host vehicle message, and for the driver (or the car) to take the appropriate action.

In another embodiment, we have: A method for an autonomous or automated vehicle operation, said method comprising: a central computer receiving a vehicle state for said vehicle; a communication channel for said vehicle transmitting in an omni-directional radiation pattern; said communication channel for said vehicle receiving messages from all directions; and in case said vehicle state indicating a congestion on said communication channel for said vehicle, said communication channel for said vehicle transmitting in a directional pattern toward front and back of said vehicle, and said communication channel for said vehicle receiving messages from all directions.

In another embodiment, we have these options/features:

monitoring said state for said vehicle.

monitoring said congestion on said communication channel for said vehicle.

said communication channel for said vehicle switching to transmitting in an omni-directional radiation pattern.

said communication channel for said vehicle switching back and forth, based on congestion, between transmitting in an omni-directional radiation pattern and transmitting in a directional pattern toward said front and back of said vehicle.

monitoring a threshold value for said congestion on said communication channel for said vehicle.

monitoring a threshold value based on number of messages, or packet error rate for said congestion on said communication channel for said vehicle.

monitoring a threshold value based on number of cars for said congestion on said communication channel for said vehicle.

monitoring a threshold value based on bandwidth capacity of said communication channel for said congestion level on said communication channel for said vehicle.

using multiple of directional transmission schemes or patterns.

using map of a road for switching on transmission methods.

using map and elevation data of a road for optimization of switching on transmission methods.

using a combination of directional transmission and non-directional transmission simultaneously.

using a number of directional transmission schemes or patterns to optimize system performance in the congested environment.

using antenna arrays, a group of antennas, Cassegrain antenna, or parabolic antenna for directing signal transmission and reception.

using map and intersections data as potential danger points for a road for optimization of switching between transmission methods.

independently optimizing transmission and listening modes or methods, based on continuous monitoring for the communication environment.

combining optimization of transmission and listening modes or methods.

optimizing of transmission based on multiple thresholds, conditions, or triggers.

Figure 2:
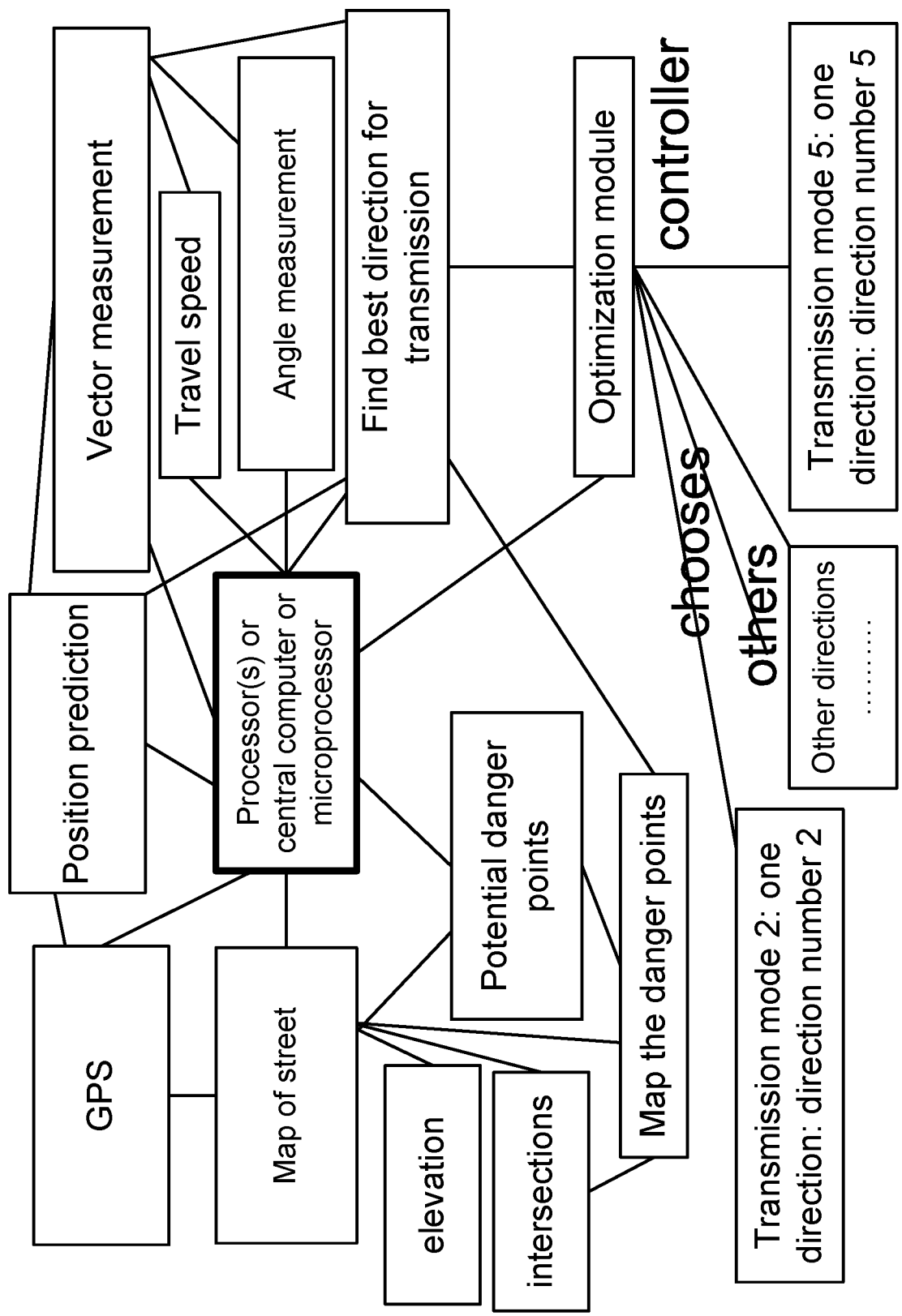
FIG. 2 is for one embodiment, as an example, for a system with monitoring congestion with multiple modes of directional transmission, with prediction of potential dangers ahead.
Figure 3:
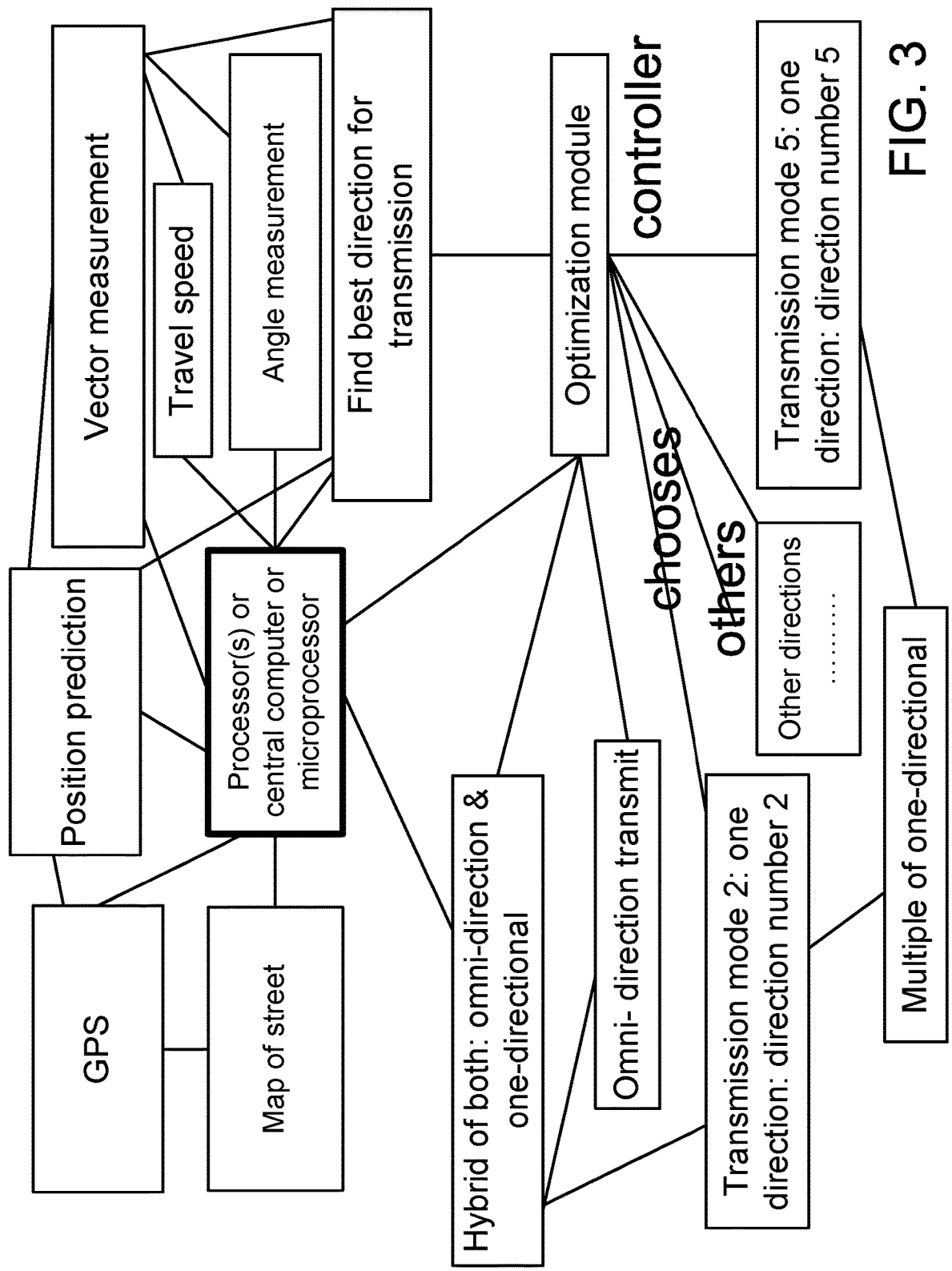
FIG. 3 is for one embodiment, as an example, for a system with monitoring congestion with multiple modes of transmission, including hybrid modes and multiple modes together.

FIG. 1 is for one embodiment, as an example, for a system with monitoring congestion with multiple modes of transmission, including transition mode. FIG. 2 is for one embodiment, as an example, for a system with monitoring congestion with multiple modes of directional transmission, with prediction of potential dangers ahead. FIG. 3 is for one embodiment, as an example, for a system with monitoring congestion with multiple modes of transmission, including hybrid modes and multiple modes together.

Figure 4:
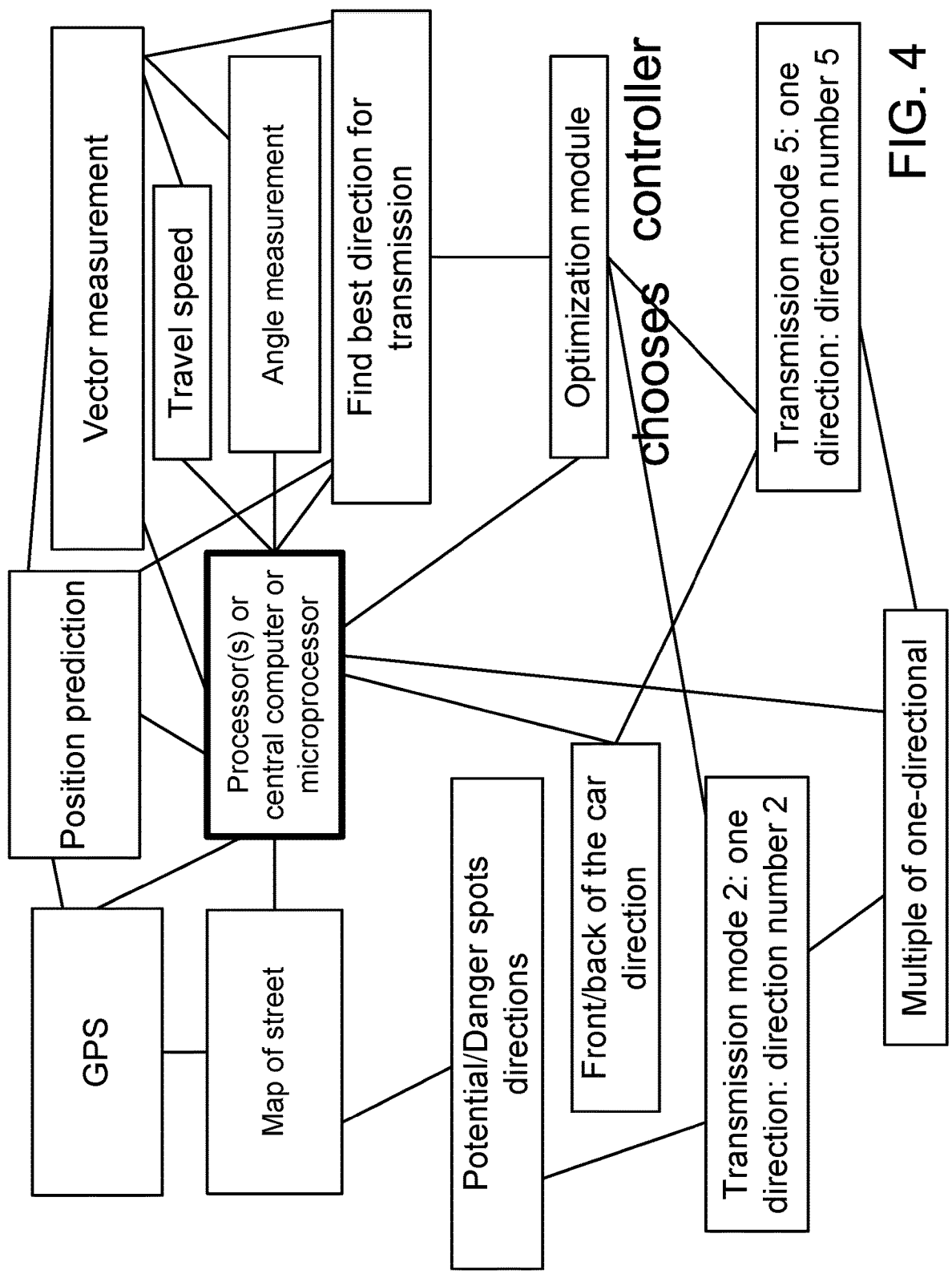
FIG. 4 is for one embodiment, as an example, for a system with monitoring congestion with multiple modes of transmission, including the front/back of the vehicle direction of transmission and the danger-spot direction ahead.
Figure 5:
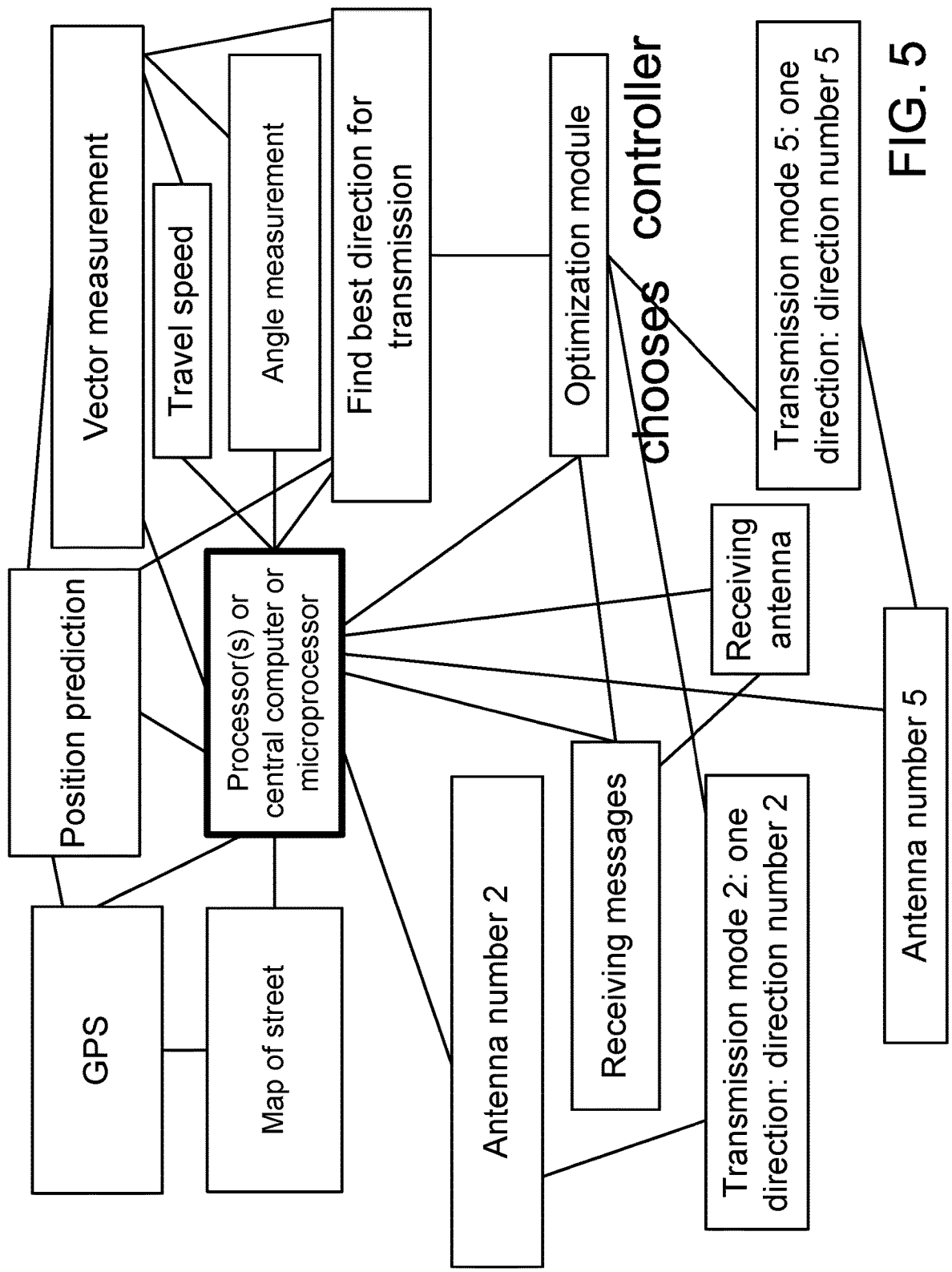
FIG. 5 is for one embodiment, as an example, for a system with monitoring congestion with multiple modes of transmission, including multiple antennas.
Figure 6:
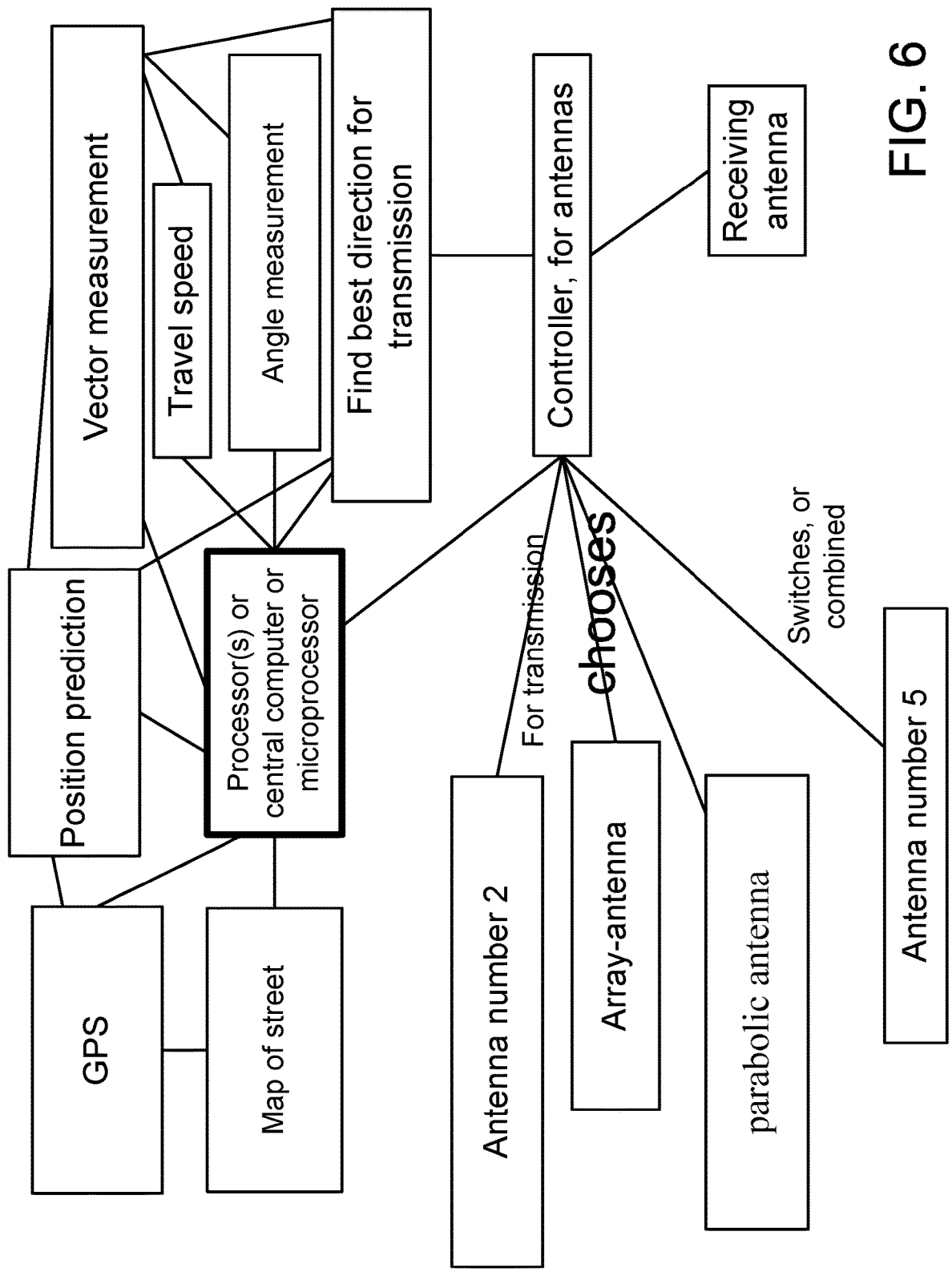
FIG. 6 is for one embodiment, as an example, for a system with monitoring congestion with multiple modes of transmission, including various antennas.

FIG. 4 is for one embodiment, as an example, for a system with monitoring congestion with multiple modes of transmission, including the front/back of the vehicle direction of transmission and the danger-spot direction ahead. FIG. 5 is for one embodiment, as an example, for a system with monitoring congestion with multiple modes of transmission, including multiple antennas. FIG. 6 is for one embodiment, as an example, for a system with monitoring congestion with multiple modes of transmission, including various antennas.

Figure 7:
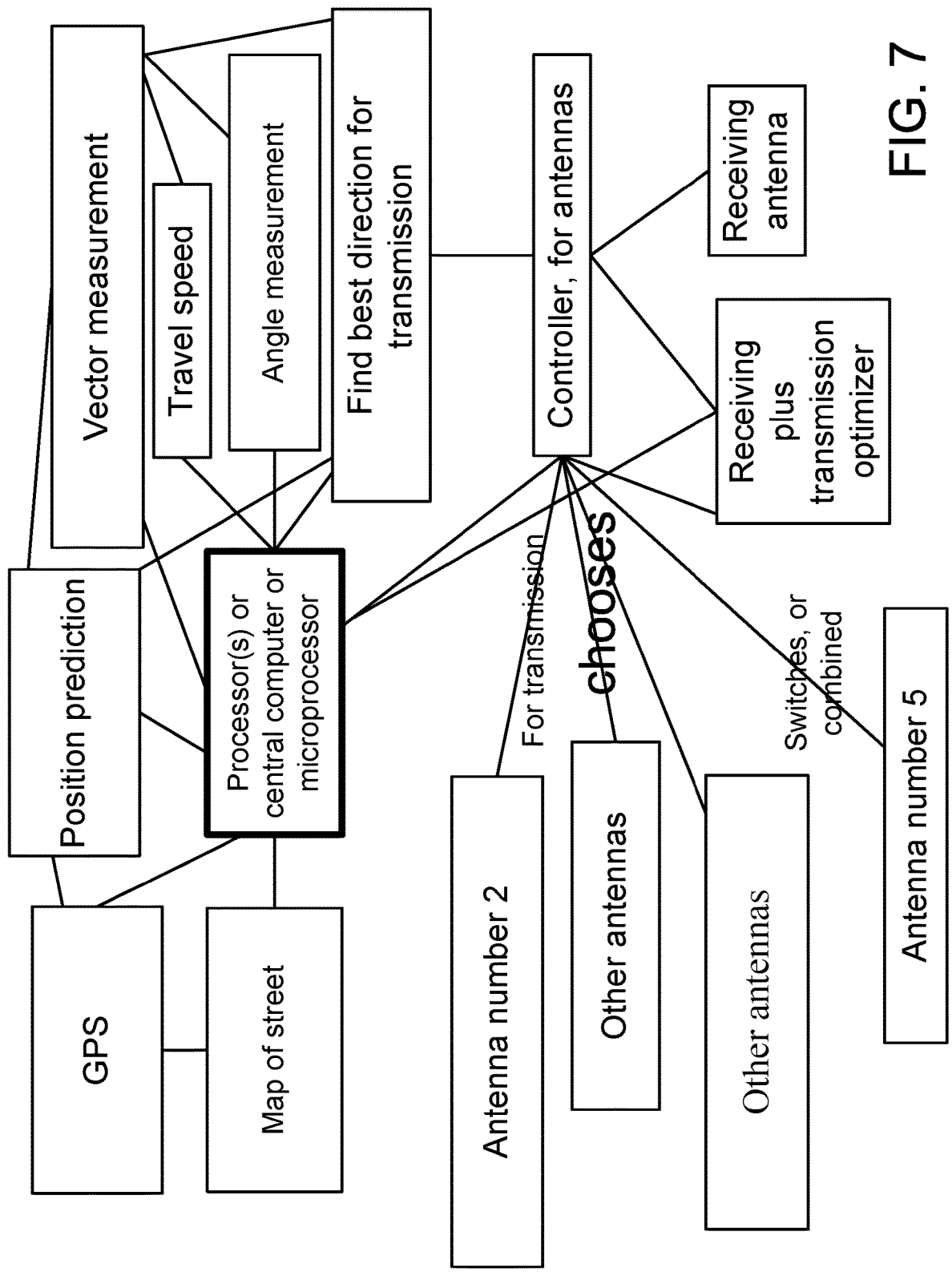
FIG. 7 is for one embodiment, as an example, for a system with monitoring congestion with multiple modes of transmission, including various antennas for different purposes, with optimization for both transmission and receiving, combined.

FIG. 7 is for one embodiment, as an example, for a system with monitoring congestion with multiple modes of transmission, including various antennas for different purposes, with optimization for both transmission and receiving, combined.

Weather Effect:

Now, let's look at the other issue, i.e., weather effect: Here, in order to counter the loss due to heavy/extreme rain, the OBU shall change the Tx power by X %. The Tx Power Offset (Paella) should be directly proportional to the Wiper Motor Speed (V), in one example. It can be linear relationship or ratios, in one example, e.g.:

$$P_{delta}=k.V$$

Wherein k is a coefficient, or a real number.

In general, it can be a function (F( )) of V, i.e.:

$$P_{delta}=F(V)$$

In another example, it is power of Y relationship between these 2 parameters, i.e.:

$$P_{delta}=k.V^Y$$

Wherein Y can be positive or negative or fraction of 1, as a real number, for various examples.

For example, for Y=2, we have:

$$P_{delta}=k.V^2$$

For example, for Y=½, we have:

$$P_{delta}=k.V^{0.5}$$

In general, it can be a function ($F_i$( )) of rain speed ($V_{rain}$), i.e.:

$$P_{delta}=F_1(V_{rain})$$

In general, it can be a function ($F_2$( )) of humidity or rain concentration/density in a specific volume of air (H), i.e.:

$$P_{delta}=F_2(H)$$

The functions ($F_1$( )) and ($F_2$( )) can be linear, or power relationship, with positive or negative or fraction of 1, as a real number, or any other function or relationship, as for example shown above, in one embodiment. Or, it can be based on a table, curve, experimental results, equation, or the like, in one embodiment.

In one embodiment, there is a trigger to increment the automatic Tx power:

Wiper Status sent to the OBU with Wiper Speed >=5 AND/OR

If the Wiper Rate Front is more than 60 sweeps per minute.

And vice versa, for the Tx Power rollback to the default value.

See FIG. 1 Appendix 1, for diagram of the situation. (Say, e.g., 50 to 100 Meters coverage is lost, and weak dent is created, due to the propagation loss.)

The disclosure increases/decreases the OBU Tx power, so that the loss due to the rainfall/snowfall droplets specific propagation loss is countered.

Some Background:

A) V2X and CAN:

After market safety device (ASD) in vehicle transmits the signal in a preconfigured transmitting power value.

Signal path loss observed due to moderate, heavy, and extreme rain.

CAN (Controller Area Network) bus of the vehicle receives information from various internal sensors (such as humidity sensor, temperature sensor, etc).

(Automatic) Vehicle wipers are activated upon the rain sensor input to the wiper motor.

Vehicle wiper motor automatic speed incrementation are based on the rain speed.

B) CAN Standard Reference:

As per High Speed CAN Message and Signal (CAN Standard 601-604), OBU can receive the wiper sweep status for every 100 ms.

Wiper status varies from, e.g., 0-7, depending upon the intensity/rate/speed/density of the rainfall/snowfall.

Wiper sweep rate ranges from, e.g., 0-127 sweeps per minute in accordance with intensity of rainfall/snowfall.

(Please see FIG. 2 Appendix 1 for the details.)

C) Propagation loss due to rain:

Prior Art 1: US20090160700 (Monitoring and Mapping of Atmospheric Phenomena) (see FIG. 3 Appendix 1)

Prior Art 2: IEEE802.16cc:

The propagation loss occurs depending upon the intensity of the rain. In this standard, power-law form of rain specific attenuation is expressed as: $k*R^\alpha$ (where k and a are the power-law parameters, and R is the rain rate in mm/hr.)

The average of the four different Power-law parameters (gamma, logNormal, Laws & Parsons, and Marshall & Palmer) raindrop size distributions, 6 GHz RF, rain temperature of zero degree Celsius, are considered and drafted the chart from 5 mm/hr to 75 mm/hr.

See FIG. 4 Appendix 1 for the curve.

As per IEEE 802.16cc:

5 mm/hr to ~55 mm/hr (Moderate Rain) gives less than 10% loss

Greater than ~55 mm/hr (Heavy, Extreme Rain) gives more than 10% loss 802.16cc:

The power-law for rain specific attenuation approach is considered here to identify the propagation loss for the V2X signals (6 GHz).

The calculated attenuation is the minimum value, as it assumed a 0 degree temperature rain and one geographical location altitude.

Attenuation will be much higher for a higher altitude, as well as normal rain temperature (say: 15 degree).

Note: One of the published patents which quoted 802.16cc was US 20090160700.

Prior Art 3: Theoretical communications range in environmental condition:

Calculation of communication range, from Friis Transmission theory/formula: See FIG. 5 Appendix 1.

As per an earlier study test:

A completely unobstructed straight line single antenna configuration alone have a loss of −6 dB to −10 dB (with no rain attenuation).

NLOS Obstructed Single Antenna configuration have a loss of −19 dB to −22 dB (without rain attenuation).

Single Antenna and Dual Antenna have same result for this study.

This study is also considered for OBU receiver power strength (in addition to the rain attenuation).

For the test results for the unobstructed single antenna configuration & obstructed single antenna configuration, see FIG. 6 Appendix 1.

For the diagram of a curvy road with multiple cars scenario, see FIG. 7 Appendix 1.

OBU Receive Power is calculated, in addition to the existing loss for different probable conditions.

Stationary vehicle or both slow moving OBU 1000 Meters or 500 Meters

Figure 8:
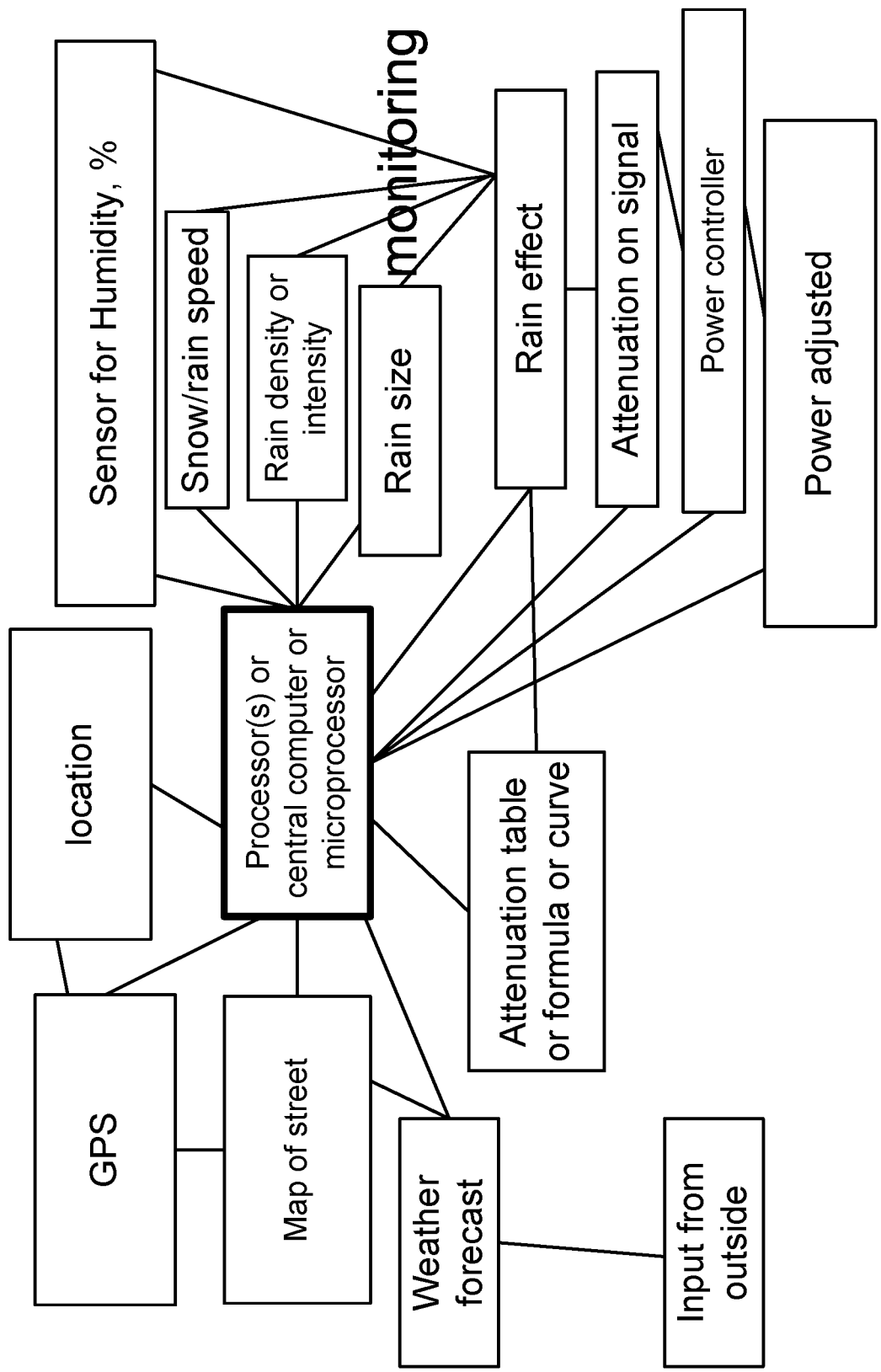
FIG. 8 is for one embodiment, as an example, for a system with monitoring rain or snow, with power adjustment.

For unobstructed route for 1000 meters and 500 meters, for ideal stationary, scenario/tables/results, see FIG. 8 Appendix 1.

Figure 9:
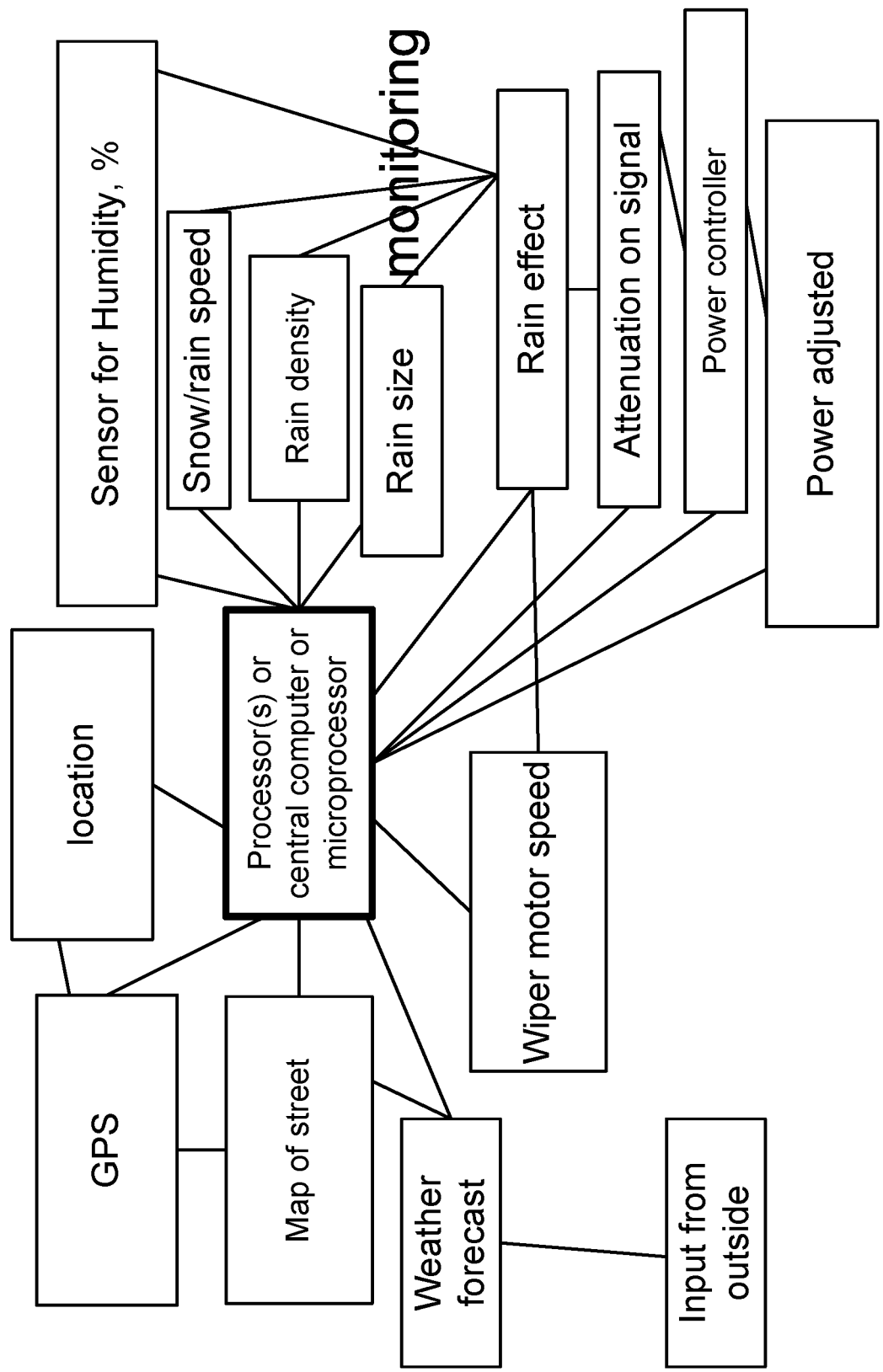
FIG. 9 is for one embodiment, as an example, for a system with monitoring rain or snow, with power adjustment, and using wiper motor speed, as well.

For unobstructed route for 1000 meters and 500 meters, with HV/RV moving at 45 km/hr, scenario/tables/results, see FIG. 9 Appendix 1.

Power loss due to the vehicle speed and lane condition are also considered during heavy rain condition.

Rain Attenuation:

Attenuation due to raindrops are greater than other forms of precipitation attenuation. It may be caused by absorption in which the raindrop, acting as a poor dielectric, absorbs power from the radio wave and dissipates the power by heat loss or by scattering (see FIG. 10 Appendix 1). Raindrops cause greater attenuation by scattering than by absorption at frequencies above 100 MegaHertz. At frequencies above 6 GigaHertz, attenuation by raindrop scattering is even greater. (http://www.ve6x1.ca/index.htm?propagationinfo.htm)

Rain Intensity:

How fast rain is falling is classified per the rate of recording/detecting precipitation, as shown in FIG. 11 Appendix 1.

Now, let's look at patent application number US20140002277A1:

A system configured to communicate with a device in a vehicle, which comprises a communications resource for receiving vehicle data indicative of a parameter of the vehicle; and a processing resource operable to obtain weather data and to process the weather data and the vehicle data, to determine at least one weather-related condition.

Now, we have:

Propagation loss at NLOS and unobstructed path is unavoidable, and the loss also varies according to the speed of the vehicle. In addition to the NLOS Propagation loss, the rain specific attenuation is possible during the heavy and heavy+rain conditions.

Weather based automatic Tx power need not/may not be considered for mild fog/rain/drizzle (as the packet loss or attenuation will be minimal).

Weather based automatic Tx power need not/may not be considered for manually kicked wiper, or it shall be considered in conjunction with the CAN Sensor Data Information.

Weather based Automatic Tx power should interwork with the existing Congestion Control mechanism, to avoid injecting unwanted RF interference.

Other Information:

Automated vehicle functional architecture: (see FIG. 12 Appendix 1)

This includes, e.g., sensing, perception, applications, and actuation.

Most vehicles have automatic wiper control circuit for operating wipers, automatically, when moisture is sensed. The control circuit additionally provides for increasing the speed of a dual speed wiper motor, when a high level of moisture is detected. The system comprises a moisture sensor which senses moisture thereon. A circuit associated with the moisture sensor converts the moisture level to the DC voltage. At a preselected level of this DC voltage, the wiper motor operates in one of its different speeds. A lack of a predetermined amount of moisture terminates the wiper motor operation.

Rain Specific Path Loss (Attenuation):

IEEE 802.16 details the rain specific attenuation (dB/km) for a rain temperature of 0-degree C., for a rain rates from 0 to 150 mm/hr, over the frequency range of 5-100 GHz. (http://www.ieee802.org/16/tg2_orig/contrib/80216cc-99_24.pdf)

A fundamental quantity in the calculation of rain attenuation statistics is the specific attenuation (attenuation per unit distance). The power-law form of rain specific attenuation is convenient and is commonly used. It is expressed as (k*Rα); where k and a are the power-law parameters, and R is the rain rate in mm/h. Power-law parameters were available in the technical literature for different raindrop size distributions (gamma, logNormal, Laws and Parsons, and Marshall and Palmer). (https://en.wikipedia.org/wiki/Rain # Droplet_size_distribution)

The trend for the attenuation due to rain increases exponentially, as shown in FIG. 13 Appendix 1, plus Appendix 2 (based on the 802.16 formula and power parameter).

All the mentioned raindrop size distributions (gamma, logNormal, Laws and Parsons, and Marshall and Palmer) followed the same exponential pattern of rain specific attenuation factor. Average of all the distributions are collected for each rain rate (5 mm/hr to 60 mm/hr), and a graph is drafted, as shown in FIG. 13 Appendix 1, plus Appendix 2 (all pages, including the table and the curve).

As seen in the graph of FIG. 14 Appendix 1, the path loss in percentage for a 20 dB ASD radio per km starts from 0.02 (for 5 mm/hr rate for rain), and trending exponentially at 25 mm/hr (heavy rainfall), i.e., the path loss exponentially increases as the raindrop intensity increases.

Generally, humidity sensor in the OBU passes the status to the CAN Data, which in turn activates the OBU wiper motors. With this available CAN data information, OBU shall be able to program the Tx power accordingly, as discussed above. FIG. 15 Appendix 1 shows such a system, for OBU and wiper.

Possible advantages of increasing Tx power, in this case:
Counter the lost coverage due to propagation loss.
Does not increase the coverage area as such & does not cause interference to other vehicles.
This proposal increases the Tx power temporarily, and rolls back to default Tx power, when the intensity is reduced.
e.g., when the vehicle entered a highway tunnel, the Tx power is brought back to default power. And when the vehicle comes out of the tunnel, the Tx power considers the rain/wiper sweep speed, and increases the Tx power, accordingly.

Possible issues, without weather-based Tx power control, is delay in target classification (due to packet loss/drop).

Figure 10:
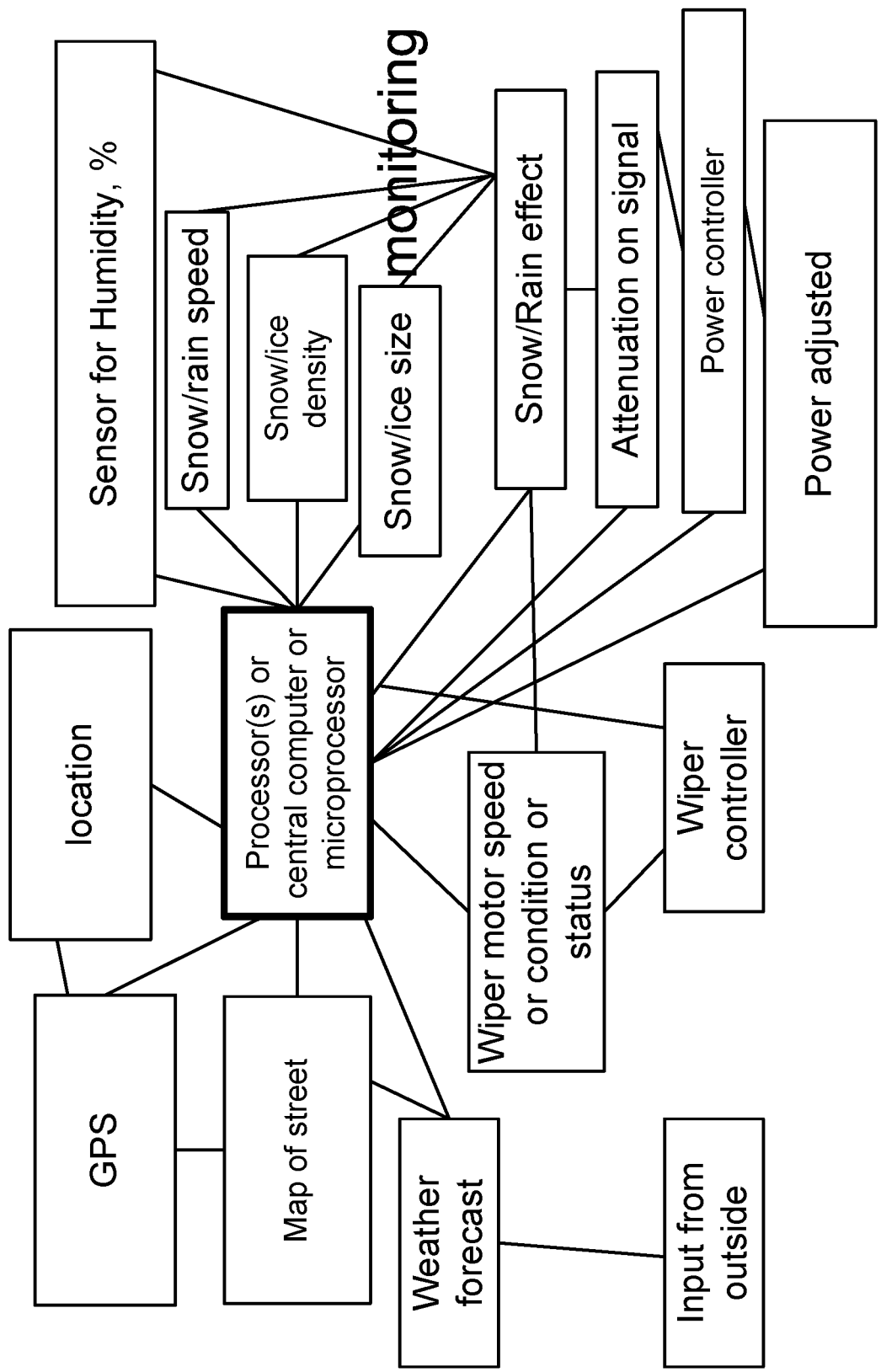
FIG. 10 is for one embodiment, as an example, for a system with monitoring rain or snow/ice, with power adjustment, and using wiper motor speed/status, as well (based on a condition/rule/controller).

FIG. 8 is for one embodiment, as an example, for a system with monitoring rain or snow, with power adjustment. FIG. 9 is for one embodiment, as an example, for a system with monitoring rain or snow, with power adjustment, and using wiper motor speed, as well. FIG. 10 is for one embodiment, as an example, for a system with monitoring rain or snow/ice, with power adjustment, and using wiper motor speed/status, as well (based on a condition/rule/controller).

In this disclosure, any computing device, such as processor, microprocessor(s), computer, PC, pad, laptop, server, server farm, multi-cores, telephone, mobile device, smart glass, smart phone, computing system, tablet, or PDA can be used. The communication can be done by or using sound, laser, optical, magnetic, electromagnetic, wireless, wired, antenna, pulsed, encrypted, encoded, or combination of the above. The memory can be based on RAM, ROM, optical, magnetic, hard drive, cloud, flash memory, farm based, CD, CD-ROM, tape, disk, floppy, removable device, or the like. The vehicles can be car, sedan, truck, bus, pickup truck, SUV, tractor, agricultural machinery, entertainment vehicles, motorcycle, bike, bicycle, hybrid, or the like. The roads can be one-lane county road, divided highway, boulevard, multi-lane road, one-way road, two-way road, or city street. Any variations of the above teachings are also intended to be covered by this patent application.

The invention claimed is:

1. A method for an autonomous or automated vehicle operation, said method comprising:
   a central computer receiving a vehicle state for said vehicle;
   a communication channel for said vehicle transmitting in an omni-directional radiation pattern;
   said communication channel for said vehicle receiving messages from all directions;
   in case said vehicle state indicating a congestion on said communication channel for said vehicle, said communication channel for said vehicle changing to transmission in a specific directional pattern, and said communication channel for said vehicle continuing receiving messages from all directions.

2. The method for an autonomous or automated vehicle operation, as recited in claim 1, said method comprises:
   in case channel congestion is detected, said communication channel for said vehicle changing to transmission in a directional pattern toward front and back of said vehicle, and said communication channel for said vehicle continuing receiving messages from all directions.

3. The method for an autonomous or automated vehicle operation, as recited in claim 2, said method comprises:
   said communication channel for said vehicle switching between transmitting in an omni-directional radiation pattern and transmitting in a directional pattern toward said front and back of said vehicle, based on channel congestion.

4. The method for an autonomous or automated vehicle operation, as recited in claim 2, said method comprises:
   said communication channel for said vehicle switching between transmitting in an omni-directional radiation pattern and transmitting in a directional pattern toward said front and back of said vehicle, based on driving speed.

5. The method for an autonomous or automated vehicle operation, as recited in claim 1, said method comprises:
   monitoring said state for said vehicle, or
   monitoring said congestion on said communication channel for said vehicle.

6. The method for an autonomous or automated vehicle operation, as recited in claim 1, said method comprises:
   said communication channel for said vehicle switching to transmitting in an omni-directional radiation pattern.

7. The method for an autonomous or automated vehicle operation, as recited in claim 1, said method comprises:
   monitoring a threshold value for said congestion on said communication channel for said vehicle.

8. The method for an autonomous or automated vehicle operation, as recited in claim 1, said method comprises:
   monitoring a threshold value based on number of messages, or rate of messages for said congestion on said communication channel for said vehicle, or
   monitoring a threshold value based on number of cars for said congestion on said communication channel for said vehicle.

9. The method for an autonomous or automated vehicle operation, as recited in claim 1, said method comprises:

monitoring a threshold value based on bandwidth capacity of said communication channel for said congestion on said communication channel for said vehicle.

10. The method for an autonomous or automated vehicle operation, as recited in claim 1, said method comprises:
using multiple of directional transmission schemes or patterns.

11. The method for an autonomous or automated vehicle operation, as recited in claim 1, said method comprises:
using map of a road for switching on transmission methods.

12. The method for an autonomous or automated vehicle operation, as recited in claim 1, said method comprises:
using map and elevation data of a road for optimization of switching on transmission methods.

13. The method for an autonomous or automated vehicle operation, as recited in claim 1, said method comprises:
using a combination of directional transmission and non-directional transmission simultaneously.

14. The method for an autonomous or automated vehicle operation, as recited in claim 1, said method comprises:
using 2 of directional transmission schemes or patterns.

15. The method for an autonomous or automated vehicle operation, as recited in claim 1, said method comprises:
using antenna arrays, a group of antennas, Cassegrain antenna, or parabolic antenna.

16. The method for an autonomous or automated vehicle operation, as recited in claim 1, said method comprises:
using map and intersections data as potential danger points for a road for optimization of switching on transmission methods.

17. The method for an autonomous or automated vehicle operation, as recited in claim 1, said method comprises:
using a transition mode of transmission between and for optimization of switching on transmission methods.

18. The method for an autonomous or automated vehicle operation, as recited in claim 1, said method comprises:
independently optimizing transmission and listening modes or methods.

19. The method for an autonomous or automated vehicle operation, as recited in claim 1, said method comprises:
combining optimization of transmission and listening modes or methods.

20. The method for an autonomous or automated vehicle operation, as recited in claim 1, said method comprises:
optimizing of transmission based on multiple thresholds, conditions, or triggers.

* * * * *